Feb. 15, 1955 R. A. STACY 2,702,348

AUTOMATIC FREQUENCY CONTROL

Filed Oct. 3, 1950 2 Sheets-Sheet 1

INVENTOR.
ROBERT A. STACY
BY Allen D. Redfield
Charles M. Hogan
ATTORNEYS.

INVENTOR.
ROBERT A. STACY
BY
Alden D. Redfield
Charles M. Hogan
ATTORNEYS 2,702,348

AUTOMATIC FREQUENCY CONTROL

Robert A. Stacy, Cincinnati, Ohio, assignor to Avco Manufacturing Corporation, Cincinnati, Ohio, a corporation of Delaware Application October 3, 1950, Serial No. 188,210

2 Claims. (Cl. 250—36)

The present invention relates to improvements in automatic frequency control (AFC) or synchronizing control systems and specifically to a novel indirect synchronizing system of particular utility for controlling the horizontal deflecting system of a television receiver. The improvements relate particularly to the pulse-width control type of automatic synchronizing circuit.

*The prior art*

The prior art embraces various types of automatic synchronizing control circuits, which possess well-known advantages over directly triggered deflecting systems. Three of the more popular circuits are described in an article by E. L. Clark, "Automatic frequency phase control of television sweep circuits," Proceedings of the I. R. E., pp. 497 et seq., vol. 37, No. 5, May 1949, published by the Institute of Radio Engineers, New York, New York.

The flywheel or synchrolock AFC system employs a sine wave oscillator to control a discharge tube, includes a discriminator comprising a pair of diodes which are sensitive to the phase differential between sine-wave signals and line-frequency synchronizing signals to derive a unidirectional control potential, and applies the control potential to a reactance tube to maintain synchronism by governing the frequency of the sine-wave oscillator. This system is fully described in the U. S. Patent No. 2,460,112 to Anthony Wright and Edwin L. Clark, and in the following publications:

Radio & Television News, January 1950, "Modern television receivers," Kiver, part 21, pp. 45 et seq., Ziff-Davis Publishing Company, Chicago, Illinois;

Basic Television—Principles and Servicing, pp. 335 et seq., Bernard Grob, first edition, McGraw-Hill Book Company, New York, New York, 1949;

Television Simplified, pp. 294 et seq., Milton S. Kiver, second edition, D. Van Nostrand Company, Inc., New York, New York, 1948;

Photofact Television Course, first edition, pp. 101 et seq., Howard W. Sams & Company, Inc., Indianapolis, Indiana, 1949.

The flywheel system gives favorable results by comparison with directly synchronized deflecting systems, but it utilizes an excessively large number of tubes.

The sawtooth type of AFC utilizes the horizontal synchronizing pulses to key into conductivity a pair of diodes included in a phase detector. This detector compares the phase of the sawtooth signals derived from the horizontal output and the synchronizing pulses, thereby to develop a unidirectional control potential. This potential is amplified and filtered and finally applied to a relaxation device to synchronize the deflecting system. The sawtooth AFC system is described in the following patents and publications:

U. S. Patent 2,358,545 to Wendt;

Clark article cited above, pp. 497 et seq.;

Grob text cited above, pp. 339 et seq.;

Radio & Television News, "Modern television receivers," part 22, February 1950, pp. 43 et seq.

The sawtooth system suffers from the disadvantage that a direct current (D. C.) amplifier must generally be used in order to produce a sufficiently intense AFC potential.

As stated in the above-mentioned Clark article, the third system, variously known as synchroguide, pulse-width control or pulse-time system, uses the least number of tubes of the three commonly featured fundamental systems. The basic synchroguide circuit is described in the following publications:

Photofact Television Course cited above, pp. 83 et seq.;

Clark article cited above, pp. 499;

Grob text cited above, pp. 340 et seq.;

Radio & Television News, "Modern television receivers," part 23, March 1950, pp. 50 et seq.

In this conventional synchroguide system three distinct pulse waves are applied to the grid of a single tube which controls the frequency of a blocking oscillator: the stripped horizontal synchronizing pulses (curve A, Fig. 2), negative flyback pulses from the output transformer (curve C, Fig. 2), and parabolic pulses (curve B, Fig. 2) which are obtained by integrating the sawtooth output of the discharge capacitor. The plate current of the control tube consists of pulses the width of which is determined by the relative positions of the sync pulses atop the peaks of the combined parabolic pulses and negative flyback pulses (curve D, Fig. 2). The control tube current pulses are filtered or integrated in the cathode circuit. The cathode circuit includes resistance common to the grid circuit of the blocking oscillator, and the unidirectional filtered current flowing therein provides a voltage which controls the frequency of oscillation by varying the amount of time required for the grid bias of the oscillator tube to decline to the point at which it becomes conductive, thus maintaining the phase of the oscillator with respect to the synchronizing signal within close limits.

*The objects of the invention*

It has been noted that the synchroguide circuit is a "three pulse system" in the sense that three distinct wave forms are applied to the grid of the control tube through three channels, as shown in Fig. 3 of the Clark article cited above. Various endeavors have been made to eliminate one of these channels and the necessity for feeding the flyback pulses back to the control tube grid, particularly when an autotransformer is used in the horizontal output to the deflecting coils (where no negative pulse is available). One simplified AFC circuit of this general type is described in Radio & Television News, Cornell, "A single tube A. F. C. circuit for TV deflection systems," Fig. 1, pp. 58 et seq., January 1950. (See also the Television Technical Preliminary Service Data for RCA Television Receiver Model TA–169, dated February 7, 1950.) In this system an attenuated sample from the sawtooth-wave-generating capacitor is fed to the grid of the control tube, together with the stripped synchronizing signal of positive polarity. The control tube filtered cathode potential output, applied to the blocking oscillator grid, is a function of their phase relationships. The feedback signal or sawtooth wave sample may be referred to as a response pulse. The stripped synchronizing signal is an order pulse. The AFC system functions to maintain frequency synchronism between order and response. The phase sensitivity of the simplified or two-channel synchroguide system is a function of the slope or rate of change of the response pulse, as applied to the control tube grid, near to and at the end of trace (i. e., during and immediately preceding the interval of time coincidence between the order and response pulses). It is an object of the present invention to provide an improved and particularly sensitive simplified pulse-width AFC system in which the gating action and sensitivity of the control tube are improved by providing a desirably-shaped response pulse.

A broader object of the invention is to provide an improved pulse-width control AFC circuit of the two-channel type. The advantages of this general type of circuit are as follows: First, simplification of the horizontal output transformer and circuitry, there being no necessity to provide the separate secondary winding or other source which conventionally supplies the above-mentioned flyback pulses (curve C, Fig. 2); second, elimination of the connections from flyback pulse source to the AFC control tube; third, independence of the control potential on the magnitude of the flyback pulses, a factor which varies with picture brightness or contrast control adjustment or the power drain on the conventional flyback power supply and introduces an undesired variation into the control pulse shape, which ideally is purely a function of the phase relationship between order and response pulses.

Another object of the invention is to provide a pulse-width AFC circuit in which the blocking oscillator grid circuit alone is utilized as the point from which feedback data pulse information is directly applied to the control tube grid as the response pulse. The blocking oscillator grid-voltage pulse has adequate leading edge characteristics for gating the control tube into conductivity substantially at the instant of application of the order or stripped synchronizing pulse to its grid, and the blocking oscillator grid-voltage pulse has particularly desirable trailing edge characteristics for cutting off the control tube. While a sawtooth pulse has a gradually sloping trailing edge, the voltage wave form at the oscillator has an extremely sharp, deep and steep trailing edge. So far as I am aware, no one has heretofore conceived the idea of utilizing a point directly or conductively connected to the blocking oscillator grid as the point of origin for response pulses which cleanly and sharply determine the plate current pulses of the control tube, thereby increasing the functional dependence of plate pulse width on the phase differential between order and response pulses.

A specific object of the invention is to provide an improvement in an indirect synchronizing system comprising a control tube responsive to phase relationship between order and response pulses applied to its grid for producing a unidirectional frequency controlling potential, a capacitor and a source of power for periodically charging the capacitor to generate a sawtooth deflecting signal, a blocking oscillator frequency-controlled by said potential for periodically discharging said capacitor, a source of order pulses in the form of synchronizing pulses, and a resonant circuit in the discharge path of said sawtooth capacitor. This improvement comprises means for applying to the grid of said control tube response pulses each comprising a component generated at the grid of said blocking oscillator and a component produced by said resonant circuit. I am aware that, in directly synchronized systems comprising a blocking oscillator, sinusoidal components have heretofore been fed back to the blocking oscillator input for purposes of sine wave stabilization. However, no one has heretofore conceived the ideas of feeding a resonant circuit output component to the input of an AFC control tube, or feeding a pulse taken from the blocking oscillator grid to the input of an AFC control tube, or applying both the resonant-circuit output component and the blocking oscillator grid pulse component to the AFC control tube input as a composite response pulse. An objective of my invention is to provide an AFC system including means for applying such composite response pulses to the control tube.

A further object of the invention is to provide means for damping out high-frequency ring in the response pulse source. Still another object is to provide this means while at the same time phase delaying the response signals, thereby effectively utilizing a larger portion of the blanking pulse and preventing folding of the picture.

In accordance with the invention as viewed in a very narrow aspect, I provide, in a television receiver, the combination of a blocking oscillator (tube 11 and associated elements) the frequency of which is controlled by a unidirectional potential (developed across resistor 24 and applied to the blocking oscillator grid 9), said oscillator comprising a vacuum tube 11 having a grid 9 and a grid resistance 39, 24, grid capacitance 41 time-constant network connected to said grid; and an automatic frequency control circuit comprising a control vacuum tube 12 having a grid 20, cathode 25, and anode 37, means 21 and 22 for biasing the input circuit of said tube to render it non-conductive throughout substantially the whole interval between synchronizing pulses, a resistance-capacitance filter network 23, 24, 26, 27, 28 in circuit with said cathode and including a resistance 24 common to said time-constant network whereby there is derived from the cathode current pulses of said control tube a unidirectional frequency controlling potential applied to the grid of said oscillator to control its frequency, means 8, 18, 19 for applying synchronizing pulses to the grid of said control tube, and means 50, 51, 52 for applying oscillator grid circuit voltage pulses as response signals to the grid of said control tube to determine the intervals of control tube conductivity, the cathode voltage output of said control tube being proportional to the average phase displacement between each synchronizing pulse and the corresponding oscillator grid voltage pulse. The novel system also includes a sawtooth capacitor 13, means 15 for periodically charging said capacitor along a linear portion of its voltage characteristic to produce driving waves for the deflection system, the D. C. controlled discharge tube 11 periodically providing a low impedance path for discharging the sawtooth capacitor, and a resonant circuit 43, 44 in the discharge path of the sawtooth capacitor and in series circuit with the discharge tube 11 and the capacitor 13, said resonant circuit being coupled to said grid circuit (by 41 and part of 40) to introduce a sinusoidal component into the response signal.

The invention is viewed more broadly in certain of the appended claims.

*The drawings*

For a better understanding of the present invention, together with other and further objects, advantages, and capabilities thereof, reference is made to the accompanying drawings, in which I have illustrated a preferred illustrative indirect automatic frequency control system in accordance with the invention.

*The construction of the invention*

Figure 1:
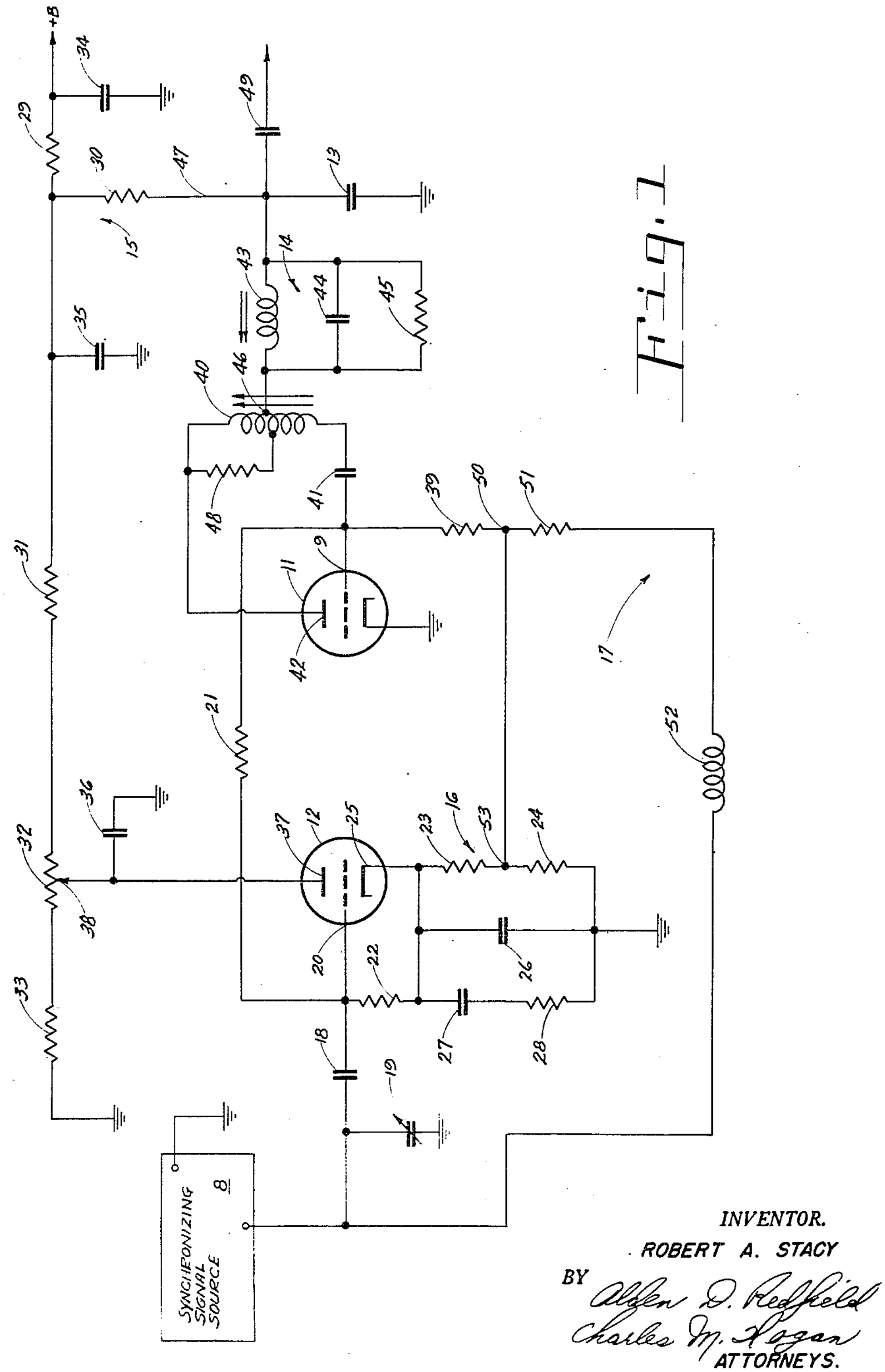
Fig. 1 is a circuit schematic of an automatic frequency control system embodying the invention.

The illustrative horizontal AFC system herein shown comprises the following principal components: a blocking oscillator and discharge tube 11, an automatic pulse-width control tube 12, a sawtooth capacitor 13, a resonant circuit 14 in the discharge path of the capacitor 13, a high voltage energy source 15 for supplying energy for capacitor 13 and tubes 11, 12, a complex time-constant circuit generally indicated at 16 for filtering the unidirectional voltage output of control tube 12, and means generally indicated by the reference numeral 17 for applying to the grid of the control tube a complex wave form consisting of a component from the resonant circuit and the pulse at the blocking oscillator grid circuit.

A coupling network comprising a series capacitor 18 and an adjustable capacitor 19 is provided for applying the stripped horizontal synchronizing pulse output (positive polarity) of the synchronizing signal separator unit or source 8 and the complex wave form from the blocking oscillator to the control electrode 20 of control tube 12. Means for D. C. biasing the control tube is provided by a connection from the oscillator grid 9 to the control tube grid 20 through a divider network comprising resistors 21, 22. Grid 20 is returned to ground through a resistor 22 and cathode resistance comprising resistors 23 and 24, the latter two resistors being serially connected between cathode 25 and ground. The advantages of indirect AFC circuits are based in part on the use of a long time-constant filter in the control system, which achieves a large measure of noise immunity. Further, it is desirable to prevent hunting of the blocking oscillator after switching the receiver from one channel to another. Accordingly, there is provided in the cathode circuit of tube 12 a network having three legs, one consisting of resistance 23, 24, another consisting of capacitor 26, the third consisting of capacitor 27 and resistance 28 in series. Cathode circuit networks of this type are described in detail at page 499, Clark article cited above; page 51, March 1950, Radio & Television News; and page 60, January 1950, Radio & Television News. The components 23, 24, 26, 27, and 28 together constitute a filter and anti-hunt circuit for "averaging out" the cathode current pulses of tube 12. This filter circuit has a fast response, in that capacitor 26 is small, and a slow response, in that the time constant of capacitor 27 and resistors 23 and 24 is large. The output of this filter is the unidirectional potential which controls the frequency of the blocking oscillator.

Plate voltage is supplied to tube 12 from a current source (not shown) indicated by the symbol +B. Between the current source and the plate of tube 12 is a filter network comprising series resistors 29, 31, 32, and 33 and shunt capacitors 34, 35, and 36, anode 37 being connected to a sliding contact 38 on resistor 32.

The filtered cathode output potential of tube 12, appearing across resistance 23, 24, controls the blocking oscillator tube 11 to produce synchronization, resistor 24 being common to the grid circuit of tube 11 and the cathode circuit of tube 12. The grid resistance components of tube 11 therefore comprise a series combination of resistance 39 and resistance 24, resistance 39 being connected between the grid 9 of oscillator tube 11 and the tube junction of resistors 23 and 24, the latter two resistors functioning also as a voltage divider.

The blocking oscillator circuit comprises a tube 11 and an iron-core adjustable autotransformer 40 arranged in a series combination with a grid capacitor 41 between anode 42 and grid 9. An LC resonant circuit comprising a parallel combination of an iron core adjustable inductor 43, a capacitor 44, and a damping resistor 45 is connected in the discharge path of a sawtooth capacitor 13, between the ungrounded terminal of capacitor 13 and a tap 46 on autotransformer 40. Plate voltage is supplied to the anode 42 from the source 15, through resistor 30, conductor 47, coil 43, and the primary of autotransformer 40, this primary being paralleled by a damping resistor 48. The cathode of tube 11 is grounded. The sawtooth horizontal deflection voltages are developed at line frequency across sawtooth capacitor 13, this capacitor being periodically slowly charged along a linear portion of its voltage-time characteristic charge curve and rapidly discharged through the low impedance path provided by oscillator tube 11 during its conductive period. The output of the sawtooth-wave-form-generating circuit is coupled to a power amplifier output circuit (not shown) by a network including a capacitor 49.

There remains to be described the means for applying to the input circuit of tube 12 a signal indicative of the response of the system to the control potential. This signal, which may be referred to as the response signal, is a composite of the usual voltage wave at the blocking oscillator grid and a component produced by the resonant circuit 43, 44. The response pulse is applied to the control tube grid 20 by a network, originating in the oscillator grid circuit, at the junction 50 of resistors 39 and 24, and comprising a series resistor 51, a series inductor 52, shunt capacitor 19, and series capacitor 18. The tuned circuit 14, the operation of which will hereinafter be more fully explained, incidentally acts as a stabilizing circuit for improving the stability of the blocking oscillator by feeding back through capacitor 41 and a portion of transformer 40 a sine wave component which is superimposed upon the well-known wave form conventionally present at grid 9. It should be noted that the sine wave stabilizing component is here applied to an indirectly controlled or D. C. controlled blocking oscillator and not to a directly controlled blocking oscillator. This incidental stabilizing of the indirectly controlled blocking oscillator is not the main purpose of the feed-back network just mentioned, the primary objective being to make manifest the sinusoidal component as a response signal component at the input of the control tube 12.

While the invention is not limited to a specific set of parameters, the following have been found satisfactory in one commercially successful embodiment of the invention.

| | |
|---|---|
| Resistor **33** | 68,000 ohms. |
| Resistor **32** | 50,000 ohms. |
| Resistor **31** | 100,000 ohms. |
| Resistor **30** | 100,000 ohms. |
| Resistor **29** | 18,000 ohms. |
| Resistor **45** | 22,000 ohms. |
| Resistor **39** | 100,000 ohms. |
| Resistor **51** | 150,000 ohms. |
| Resistor **22** | 820,000 ohms. |
| Resistor **28** | 8,200 ohms. |
| Resistor **23** | 150,000 ohms. |
| Resistor **24** | 150,000 ohms. |
| Resistor **21** | 2.7 megohms. |
| Resistor **48** | 10,000 ohms. |
| Capacitor **36** | 0.05 microfarad. |
| Capacitor **35** | 0.1 microfarad. |
| Capacitor **34** | 0.5 microfarad. |
| Capacitor **13** | 1,300 micromicrofarads. |
| Capacitor **49** | 390 micromicrofarads. |
| Capacitor **41** | 200 micromicrofarads. |
| Capacitor **44** | 0.01 microfarad. |
| Capacitor **26** | 0.02 microfarad. |
| Capacitor **27** | 0.25 microfarad. |
| Capacitor **18** | 0.0022 microfarad. |
| Capacitor **19** | 10–160 micromicrofarads. |
| Tube **12** | One-half of Type 6SN7GT. |
| Tube **11** | One-half of Type 6SN7GT. |
| Voltage at plate of tube **12** | 140 volts (variable from 100 volts to 200 volts). |
| Voltage at plate of tube **11** | 270 volts. |
| D. C. bias on grid of tube **12**. | —25 volts. |
| D. C. bias on cathode of tube **12**. | —5 volts. |
| D. C. bias on grid of tube **11**. | —80 volts. |
| Inductance **40** | 14.0 to 35.0 millihenries. |
| Inductance **43** | 6.5 to 12.0 millihenries. |
| Inductance **52** | 25 millihenries. |
| Line deflection rate | 15,750 cycles per second. |

The resonant frequency of the parallel circuit 43, 44 is approximately the line deflection rate of 15,750 cycles per second. The tunable iron core inductor 43 is made variable in order to tune with the capacitor 44 preferably near the line deflection rate.

The magnitude of the synchronizing pulses at the output of the synchronizing pulse source 8 is on the order of 12 to 16 volts peak to peak.

*Circuit operation*

It will first be assumed that the system is in synchronism and one cycle of operation beginning with the initiation of trace (time $t_0$, Fig. 3) will be described in detail. The sawtooth capacitor 13 is being charged from source +B through the network 34, 29, 30, 47 along a linear portion of its voltage characteristic curve, whereby the usual sawtooth voltage wave for driving the horizontal output is produced in conventional manner across capacitor 13. The oscillator tube 11 is cut off and the potential at its grid has become highly negative. The oscillator tube is in its non-oscillatory condition. The charge on capacitor 41 leaks off slowly through the high resistances 39 and 24 in the oscillator grid circuit, the voltage curve at grid 9 being exponential (see curve B, Fig. 4, page 59, January 1950, Radio & Television News) and gradually becoming less negative and approaching cut-off. At the end of trace (time $t_1$, Fig. 3) the sawtooth voltage has reached its maximum value and the voltage on grid 9 has reached the cut-off value, so that oscillator tube 11 becomes conductive and draws plate current.

The blocking oscillator circuit is highly regenerative, and the rise in plate current through the primary of the autotransformer 40 induces in the secondary a voltage applied to grid 9 which increases the plate current. This makes the grid more positive, which tends to increase plate current further. As the grid tends to go positive, grid current flows which causes a voltage to build up across the grid capacitor 41. The voltage across capacitor 41 builds up so rapidly that the potential difference between grid and cathode never becomes very great. As the rate of change of plate current begins to decrease, the voltage across the secondary decreases and at the instant when the rate of change is zero, the secondary voltage is zero and the voltage between grid and cathode is the voltage across capacitor 41 alone. The next instant the change of plate current is in the opposite direction, which produces a voltage in the transformer secondary in the opposite direction which adds to the voltage across capacitor 41 and makes the grid even more negative with respect to cathode. Once plate current begins to decrease the action is again cumulative, driving the grid far beyond cut-off, and stops the flow of plate current. The energy stored in the inductance of the transformer reverses itself and rings with the circuit capacity, producing a high frequency oscillation. To prevent the positive peak of the next cycle of high frequency oscillation from bringing the grid potential above cut-off, the Q of the system is made low by damping the primary of the transformer with resistor 48. The RC time constant of the grid circuit is made sufficiently long to keep the oscillator tube grid below cut-off during the trace period. It will be understood, then, that the plate circuit of oscillator 11 has a long period of non-conductivity followed by a short period of conductivity. Retrace occurs during the period of conductivity, capacitor 13 at that time discharging through the low impedance discharge path provided by the tube. It will also be understood that oscillation takes place immediately following the period of conductivity.

As the high negative grid bias is built up and plate current begins to decrease, the collapsing field in the transformer primary induces a voltage which drives the grid more and more negative, hastening the decay of plate current, with the result that at the reinitiation of trace (time $t_2$) the voltage at the grid of oscillator tube 11 is highly negative. Then the period of non-oscillation again begins and trace is reinitiated approximately at time $t_2$.

In accordance with the invention I utilize the wave form at the oscillator grid to width-modulate the synchronizing pulses at the control tube.

The trailing edge of the response pulse is herein defined as the negative going slope which occurs as the blocking oscillator tube is cut off. The trailing edge of the blocking oscillator grid voltage wave form has particularly desirable characteristics for my purpose. Reference is made to Fig. 63A, page 48, of the above-cited Photofact publication; to Fig. 9.20B, page 248, of the above-cited Television Simplified by Kiver; and to Figs. 16–7 and 16–8, pp. 294 and 295 of the Grob text, for detailed illustrations of this wave form. It is also shown in Fig. 12–9, page 592, Terman, Radio Engineering, third edition, McGraw-Hill Book Company, Inc., New York, 1947. This trailing edge is a particularly sharp and strong "knife" for terminating the plate pulse of the control tube. The blocking oscillator circuit herein shown is per se conventional and well known except in this respect: The blocking oscillator grid circuit is coupled to the control tube input through the delay and damping network 51, 52. The purposes and operation of this network are as follows: (1) It is a means for applying the grid circuit voltage pulses of the blocking oscillator to the control tube grid, whereby they width-modulate the synchronizing pulses also applied to the input of that tube, and the trailing edges of the blocking oscillator grid voltage wave forms terminate the plate pulses; (2) it filters out the high-frequency oscillation trains which occur when the oscillator tube 11 is blocked off, thus preventing their application to the control tube 12; (3) it slightly delays the composite response signals before application to the control tube grid. It has been demonstrated that such phase delay effectively advances actual retrace with respect to sync pulse reception, thus assuring that the entire retrace period occurs during the blanking of the cathode ray tube beam.

It has been pointed out how the trailing edge of the oscillator grid negative voltage pulse has a particularly desirable shape for terminating the control tube plate pulses at the end of retrace, when the oscillator is blocked. Let the generally exponential long leading portion of the oscillator grid wave form now be considered. As applied to the control tube 12 during retrace, this portion of this wave form alone would gradually condition the control tube for conductivity while biasing the tube below cut-off. It should be noted that it is not technically correct to say that this conditioning operation is coextensive with the interval between synchronizing pulses. I believe that the present invention represents the first appreciation of and practical application of the following concepts: (1) The use of this portion of the usual grid circuit wave form to condition the control tube for conductivity; (2) the combined use of the usual oscillator grid wave form and the sinusoidal component to condition the control tube of an indirectly synchronized deflecting system for conductivity.

Upon application of a positive stripped synchronizing pulse (curve A, Fig. 3) to the control tube grid, that tube becomes conductive and generates a plate current pulse. This pulse is terminated by the trailing edge of the response pulse applied to the control tube by network 50, 51, 52, 19, and 18. The width of the plate current pulse depends on the phase relationship between the synchronizing and response pulses. The width increases when the oscillator lags behind synchronism and decreases when the oscillator frequency is excessive. The unidirectional control potential applied from resistor 24 to the blocking oscillator grid accordingly increases when the oscillator lags behind synchronism, by an amount proportional to the deviation from synchronism, thereby to "speed up" the oscillator and restore synchronism. When the oscillator is too fast, this AFC control potential decreases to establish the oscillator frequency at the sync-pulse frequency.

The typical deflection cycle described above proceeds at a high repetition rate or line frequency, so that the average oscillator frequency is stabilized at the average sync-pulse frequency. It will be understood to those skilled in the art that the free-running frequency of the blocking oscillator, including tube 11 and associated components, is, in the absence of synchronizing signals, somewhat lower than line frequency. This factor is a matter of design and is well within the skill of those versed in the art.

I have found that the control tube is more effectively conditioned for conductivity and its sensitivity for phase measurement is enhanced by introducing an additional component into the response or feedback signal. Inserted in the plate supply circuit of tube 11 is a resonant circuit 43, 44, comprising inductance and capacitance. This resonant circuit is located in the discharge path of sawtooth capacitor 13. While I do not desire to be limited to any particular theory of operation, it is reasonable to state and probable that the periodic discharge current of capacitor 13, passing through the tuned circuit 43, 44 and the plate portion of the autotransformer 40 and the tube 11, shock-excites the tuned circuit into oscillation. I apply the resultant sinusoidal voltage component to the grid of the control tube 12 in such phase relationship to the usual voltage wave form at the blocking oscillator grid that the rate of conditioning to conductivity of the control tube is increased. In other words, the upward slope of the response signal, as applied to the control tube grid, is increased by the inclusion of this sinusoidal component in the response signal. The increase in upward slope occurs at the extreme trailing end portion of the leading edge of the response signal, in the region wherein the response signal and superimposed synchronizing signal cause the control tube to become conductive. The sinusoidal signal component is so phased with respect to the conventional oscillator grid circuit wave form that, if the sinusoidal component alone could be imagined as passing through a zero axis with respect to which it would be symmetrical, then the sinusoidal component would be approaching or at its maximum rate of change at the time the response pulse goes sharply negative (see curve C, Fig. 3). Otherwise stated, the phasing is not such as to "put the synchronizing signal on top of a pure sine wave amplitude peak." On the contrary, my objective is to "set the synchronizing pulse on top of the sinusoidal component at a time when the amplitude value of the latter is experiencing its maximum rate of change and heading in a positive direction." Further, there are added to this combination of wave forms applied to the grid of the control tube the components developed at the blocking oscillator grid. It is very old in the art to apply a sinusoidal component to a directly triggered blocking oscillator grid, but no one has heretofore been aware of the utility of such component in an indirect AFC system, as applied to the control tube input circuit, in combination with the oscillator grid voltage wave. The present invention features for the first time the use of a composite response pulse comprising the sinusoidal component from a resonant circuit and the blocking oscillator grid voltage component, said response pulse being applied to the input circuit of an indirect AFC control tube.

Referring now to the operation of the pulse-time automatic synchronizing control tube 12, the tube shown in Fig. 1 functions as an amplifier to furnish the control potential for the blocking oscillator. The D. C. control voltage appears across cathode resistance 23, 24 and a part of it is applied to the oscillator grid 9. The total resistance 23, 24 is tapped down at 53 to reduce the capacitance effectively in shunt with the blocking oscillator input circuit and for voltage division purposes. The magnitude of the control potential depends on the amount of plate current flowing in tube 12. In order to determine the amount of plate current through the control tube, two different voltages are applied to its grid 20. These are the stripped synchronizing pulses (curve A, Fig. 3) and the response pulses (curve C, Fig. 3). The grid voltage for determining the energy content in each plate current pulse is the resultant of these two voltages and varies with their phasing. When the oscillator increases its lag behind the synchronizing pulses, the width of that portion (60, curve D, Fig. 3) of the sync pulse at the top of the response pulse increases, because the steep negative trailing edge of the response pulse is relatively tardy in arriving to cut off tube 12. Conversely, when the oscillator decreases its lag, the width of the plate pulses decreases. The D. C. control potential output of the filter network 23, 24, 26, 27, 28 applied to the blocking oscillator changes accordingly.

The control voltage applied to the blocking oscillator corrects its frequency by varying the amount of time required for the oscillator grid bias to decline to the point where conductivity is permitted.

Figure 3:
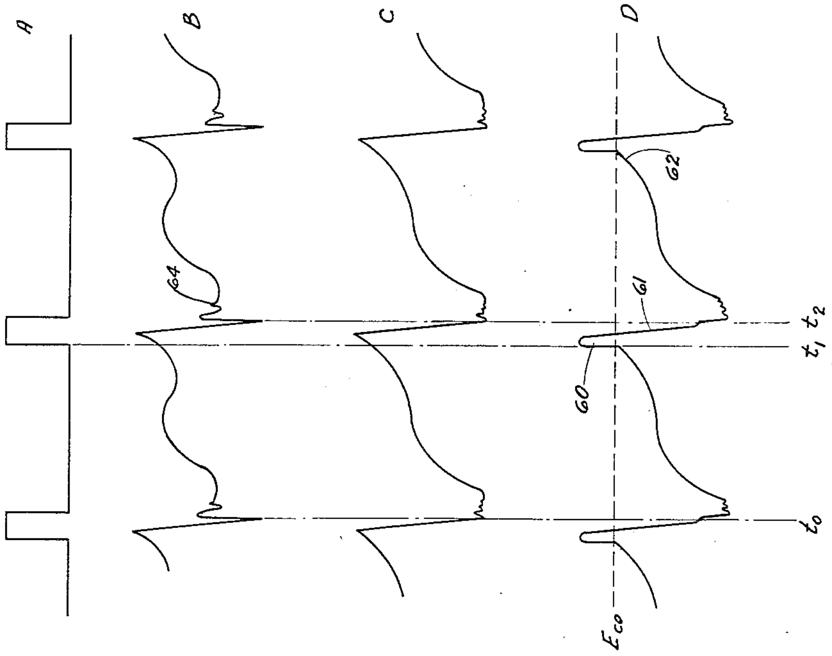
Figs. 2 and 3 are sets of wave forms employed as aids in describing the operation of the invention, Fig. 2 relating to the prior art "synchroguide" circuit, and Fig. 3 relating to the improvements in accordance with the invention.
Figure 2:
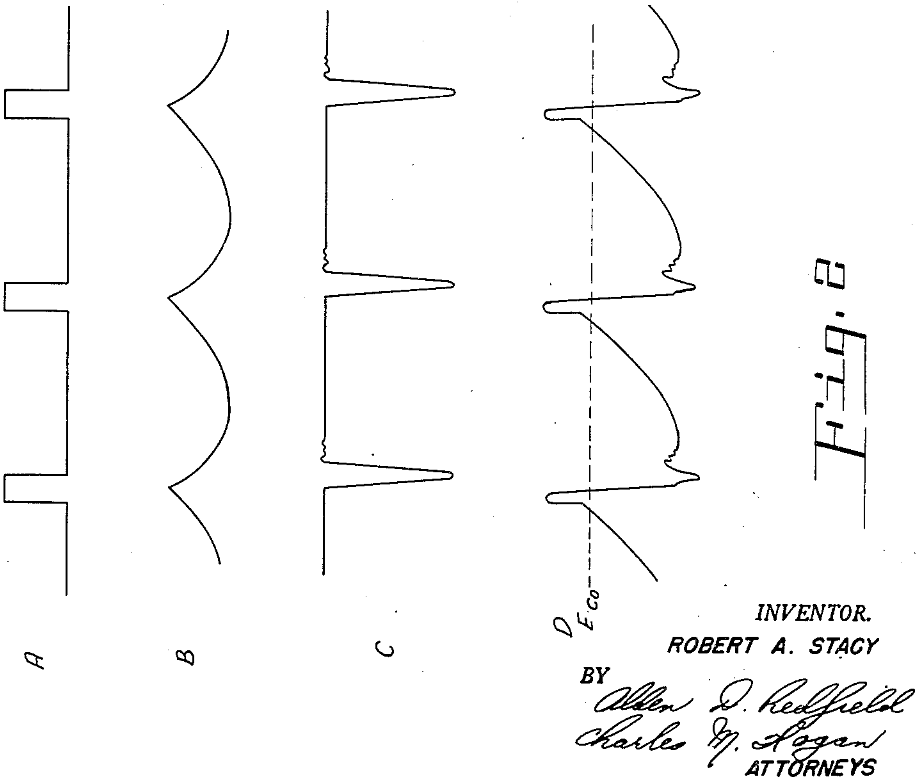

Curve B of Fig. 3 shows the response signal as it appears at point 50, and curve C of Fig. 3 shows the response signal form as applied to the control tube. It will be seen that the LC network 51, 52 filters out the high frequency sinusoidal oscillations 64 which occur during the non-conductive periods of tube 11.

A portion of the bias from the blocking oscillator is applied to the control tube by a divider network 21, 22, 23, and 24, sufficient to keep the control tube cut off except when the incoming sync pulse (curve A, Fig. 3) is high on the slope of the response pulse (curve C, Fig. 3).

Particular attention is directed to the following characteristics of the composite pulse wave form (curve D, Fig. 3) applied to the control tube 12;

(1) The plate current pulse is sharply and cleanly cut off by the steep negative swing 61;

(2) The high frequency voltage oscillations 64 occurring at the oscillator grid circuit during periods of oscillator tube conductivity are filtered out and substantially disappear from the composite wave form;

(3) The approach to conductivity of tube 12, a measure of its sensitivity, is rapid, accentuated by the presence of the response signal component derived from the resonant circuit 43, 44.

I do not desire to be limited to the specific parameters set forth above, which parameters have been found to be entirely satisfactory in commercial receivers made and sold by one of the large manufacturers. Nor do I desire to be limited to the present standards now authorized by governmental authority. The invention as defined by the appended claims is not limited to specific design parameters or to the standards currently authorized and used.

While there has been shown and described what is at present regarded as the preferred embodiment of my invention, it will be understood that various modifications and substitutions of equivalents may be made without departing from the true scope of the invention as defined by the claims hereto appended.

I claim:

1. In a television receiver including an automatic frequency control circuit comprising the combination of: First, a source of synchronizing signals; second, a phase comparator tube having an anode, cathode and control grid; third, an input circuit for said comparator tube comprising a first capacitor connected across said source and a second capacitor connected between said first capacitor and said grid, the junction of said capacitors forming a high-potential input terminal and the remaining terminal of said first capacitor being a low-potential input terminal, said input circuit also comprising a first resistance connected between said grid and said cathode and a second resistance between said cathode and said low-potential input terminal; fourth, a third capacitor in shunt with said second resistance; fifth, a blocking oscillator tube having an anode, cathode and control grid; sixth, the combination of an autotransformer and a fourth capacitor connected in series between the anode and grid of said blocking oscillator, said autotransformer having a tap; seventh, the combination of a parallel-resonant tuned circuit and a fifth capacitor connected in series in a closed discharge path between said tap and the cathode of said oscillator tube; eighth, a third resistance connected between the grid of said oscillator and said second resistance; and ninth, a fourth resistance connected between the grids of said comparator tube and said oscillator tube, the improvement which comprises impedance connected between the junction of said third and second resistors and said high-potential terminal.

2. In a television receiver including an automatic frequency control circuit comprising the combination of: First, a source of synchronizing signals; second, a phase comparator tube having an anode, cathode and control grid; third, an input circuit for said comparator tube comprising a high-potential terminal and a low-potential terminal and a capacitor connected between said high potential terminal and said grid, said input circuit also comprising resistance between said cathode and said low-potential input terminal; fourth, capacitance connected between said cathode and said low-potential terminal cooperating with said resistance to form a filter; fifth, a blocking oscillator tube having an anode, cathode and control grid; sixth, the combination of an autotransformer and a capacitor connected in series between the anode and grid of said blocking oscillator, said autotransformer having a tap; seventh, the combination of a tuned circuit and a sawtooth capacitor connected in series in a closed discharge path between said tap and the cathode of said oscillator tube; eighth, a conductor between said filter and the grid of said oscillator; and ninth, means for biasing the grid of said comparator tube, the improvement which comprises impedance connected between the grid of said oscillator and said high-potential terminal.

References Cited in the file of this patent

UNITED STATES PATENTS

| | | |
|---|---|---|
| 2,479,081 | Poch | Aug. 16, 1949 |
| 2,540,820 | Gruen | Feb. 6, 1951 |

OTHER REFERENCES

"A Single Tube A. F. C. Circuit for TV Deflection Systems," Radio & Television News. January 1950, pages 58, 59, 60 and 144.